United States Patent [19]

Kirk et al.

[11] Patent Number: 5,254,551
[45] Date of Patent: Oct. 19, 1993

[54] FLOUR FORTIFICATION FORMULATION COMPRISING GRANULATED RIBOFLAVIN

[76] Inventors: Paula S. Kirk, 5751 Golfview, Dearborn Heights, Mich. 48127; Douglass N. Schmidt, 27780 Johnson, Grosse Isle, Mich. 48138

[21] Appl. No.: 516,605
[22] Filed: Apr. 30, 1990
[51] Int. Cl.⁵ .......................................... A61K 31/525
[52] U.S. Cl. ................................................. 514/251
[58] Field of Search ......................... 514/251; 424/489

[56] References Cited

U.S. PATENT DOCUMENTS 3,959,472  5/1976  Cannalonga et al. ............... 514/251
4,486,435  12/1984  Schmidt et al. ..................... 514/251
4,868,180  9/1989  Izuhara et al. ...................... 514/251
4,994,458  2/1991  Kilbride, Jr. ....................... 514/251

Primary Examiner—Frederick E. Waddell
Assistant Examiner—Raymond J. Henley, III

[57] ABSTRACT

A flour fortification formulation comprises riboflavin in an amount of 0.5 to 10 weight percent. The riboflavin is in the form of a riboflavin granulate which exhibits a flowability index of from 75 to 750, an average granule size of from 50 microns to 300 microns. Furthermore, the granules comprise riboflavin in an amount of from 75 weight percent to 99.5 weight percent.

13 Claims, No Drawings

FLOUR FORTIFICATION FORMULATION COMPRISING GRANULATED RIBOFLAVIN

BACKGROUND OF THE INVENTION

The present invention pertains to the fortification of flour with vitamins, namely the fortification of flour with riboflavin. Pure riboflavin is a clumpy, dusty, highly electrostatic powder which sticks to and fouls processing equipment, and furthermore tends to bridge and clump during handling. Furthermore, pure riboflavin forms balls when being mixed with the additional ingredients in a typical flour fortification formula. The high flowability of the riboflavin formulation utilized in the present invention permits its substantially uniform intermixture with the remaining ingredients of the fortification formulation.

The closest art known to the inventors includes the following patents: U.S. Pat. Nos. 4,868,180; 3,959,472; 3,962,384; 4,486,435 and European patent application 0,219,276. None of these patents is directed at the use of riboflavin in flour. Rather, these patents are directed at the processing of B vitamins via fluid bed, spray drying, etc. Furthermore, none of these patents describe a riboflavin granulate which has (1) riboflavin content of at least 75 weight percent, as well as (2) less than about 10 weight percent ungranulated pure riboflavin therein.

BRIEF SUMMARY OF THE INVENTION

The present invention pertains to a flour fortification formulation which comprises riboflavin in an amount of from about 0.5 weight percent to about 10 weight percent, riboflavin assay basis. The riboflavin is present in the form of a riboflavin granulate. The riboflavin granulate has a flowability index of from about 75 to about 750. The granules have an average granule size of from about 50 microns to about 300 microns. Furthermore, the granules comprise water in an amount of from about 0.1 weight percent to about 4 weight percent, on a total granulate weight basis. Furthermore, the riboflavin granulate has less than about 10 weight percent ungranulated pure riboflavin therein. Thus, at least 90 weight percent of the riboflavin is present in the form of granules. Furthermore, the granules themselves are comprised of riboflavin in an amount of from about 75 weight percent to about 99.5 weight percent.

DETAILED DESCRIPTION OF THE PREFERRED EMBODIMENTS

The present invention pertains to a flour fortification formulation which comprises riboflavin, among other ingredients. In general, the fortification formulation may contain, in addition to riboflavin: niacin (or niacinamide), thiamine, electrolytically or hydrolytically reduced iron, a flow aid (e.g., calcium phosphate or silica), and a starch carrier (e.g., modified wheat or corn starch). Still further fortifying ingredients may be utilized, as desired. The U.S. Government has set forth a definition of enriched flour (see 21 C.F.R. §137.165), which provides the flowing minimum requirements for flour which may be labeled as "enriched": (1) at least 2.9 mg/lb thiamine, at least 1.8 mg/lb riboflavin, at least 24 mg/lb niacin, at least 20 mg/lb iron, and, optionally, at least 960 mg/lb calcium. In the manufacture of fortified flour, commercial operations typically begin with the preparation of a fortification formulation which comprises all of the fortifying ingredients. This fortification formulation, also known as a fortification "premix", is thereafter combined with flour, in a desired proportion. As a result, the relative proportions which each of the fortification ingredients have to one another is, in general, determined upon completion of the manufacture of the fortification formulation.

In general, the amount of riboflavin to be used in the formulation of the present invention should be from about 0.5 weight percent to about 10 weight percent, based on total formulation weight. Preferably the amount of riboflavin present is from about 0.5 to about 5 weight percent. Most preferably the riboflavin is present in the formulation in an amount of from about 2 to about 2.3 weight percent. Furthermore, the identity and proportions of each of the ingredients is preferably within the formulations specified by Title 21 of the Code of Federal Regulations of the United States.

The fortification formulation of the present invention comprises a granulated riboflavin. Ungranulated riboflavin in pure form, as stated above, lacks flowability, and is difficult to uniformly disperse with other powdered materials, such as the remaining ingredients of the fortification formulation and/or flour. This may be due to the fact that riboflavin crystals have a particle size which is dissimilar to the particles making up the other components of the fortification formulation. It has been found that upon attempting to uniformly distribute riboflavin crystals in a typical fortification formulation as described above, the riboflavin crystals tend to agglomerate, forming clumps of various sizes. It has been found that these clumps are comprised of substantially pure riboflavin. Flour which has been enriched with ungranulated but agglomerated pure riboflavin crystals can have an undesirable "blotchy" appearance (due to the yellow color of the riboflavin), and furthermore exhibits an unpleasant taste in the areas having a high riboflavin content (i.e., the discolored areas formed from the riboflavin agglomerates). Of all the B vitamins, riboflavin has by far the worst flow characteristics. As a result, it is highly desirable to have riboflavin in a form which will flow easily and uniformly disperse with the other dry ingredients which make up the fortification formulation, as well as with flour particles, whereby the above-mentioned agglomeration problems are not produced.

It has been surprisingly found that by granulating the riboflavin, the resulting granules have very good flowability as well as ability to mix uniformly with other solid particulates, without agglomeration. As used herein, the term granule is defined as a small grain or particle, this particle being comprised of a relatively large number of riboflavin crystals (i.e., hundreds) bound together with a relatively small amount of a binder material (i.e., no more than 25 weight percent binder on a total granulate weight basis). In stark contrast, as used herein the term "agglomerate" refers to a ball or rounded mass of riboflavin crystals which amass due to electrostatic forces and/or riboflavin crystal morphology, without the presence of any substantial quantity of binder. Accordingly, as described herein, granules are intentionally formed particles which comprise a substantial quantity of binder, whereas agglomerates are undesired and unintentionally formed balls of substantially pure riboflavin crystals. In fact, both granules and agglomerates are substantially round in shape. However, the size of granules can be reproduced with a relatively high degree of accuracy and uniformity, whereas the size of agglomerates is virtually uncontrollable. Some of the agglomerates are so large that they cause problems during downstream processing, as product uniformity cannot be achieved without producing a "blotched" or "striped" end product. Furthermore, agglomerates can blind processing screens and thereby the resulting blend has a lower-than-desired riboflavin content.

In addition to granules and agglomerates, the phrase "ungranulated pure riboflavin" is also utilized herein. This phrase refers to that portion of the riboflavin which is not bound to the binder utilized in the formulation. Individual riboflavin crystals are present in the form of particles which are much smaller than the specified granule size. Ungranulated pure riboflavin is, in general, comprised of either individual riboflavin crystals or agglomerates of riboflavin crystals of which may range in size from very small (e.g. a fraction of a micron) to very large (e.g. 20 millimeters). As used herein, the phrase "ungranulated pure riboflavin" refers to all individual riboflavin crystals or agglomerates of crystals which are not bound to the binder material.

The riboflavin granulate (present in the flour fortification formula of the present invention) in general has less than 10 weight percent ungranulated pure riboflavin therein. In other words, at least 90 weight percent of the riboflavin is present in the form of granules. If more than 10 weight percent ungranulated pure riboflavin is present in the granulate product, problems of product flow and product adherence to equipment surfaces will result.

In general, the riboflavin granulate utilized in the flour fortification formulation of the present invention has a geometric mean granule size of from about 50 microns to about 300 microns, with a standard deviation in particle size of from about 0 to about 3. Preferably, the riboflavin granules have a geometric mean granule size of from about 50 microns to about 100 microns, with a standard deviation in granule size of from about 1.0 to about 2.2. Most preferably the average granule size is from about 50 microns to about 130 microns, with a standard deviation of from about 1.0 to about 2.2. Preferably the granules are round. Furthermore, generally the granules comprise riboflavin in an amount of from about 75 weight percent to about 99.5 weight percent, based on total granule weight, and the granules further comprise a binder (described infra) in an amount of from about 0.5 weight percent to about 25 weight percent. Generally the granules comprise residual moisture (i.e., water) in an amount of from about 0.1 weight percent to about 4 weight percent. Preferably, the granules comprise riboflavin in an amount of from about 90 weight percent to about 99.5 weight percent, binder in an amount of from about 0.5 weight percent to about 10 weight percent, and water (i.e., residual moisture) in an amount of from about 0.1 weight percent to about 0.75 weight percent. Most preferably, the granules comprise riboflavin in an amount of from about 94 weight percent to about 96 weight percent, binder in an amount of from about 3 weight percent to about 5 weight percent, and water (i.e., residual moisture) in an amount of from about 0.1 weight percent to about 0.5 weight percent (most preferably about 0.5 weight percent water).

The binder utilized in the present invention may be a water-soluble binder, or a binder soluble in an organic solvent. The water-soluble binder may be a pregelatinized starch, water-soluble cellulose, a water-soluble high polymer, etc. A pregelatinized starch is a starch prepared by heating a dispersion of starch in water, or a dry starch obtained by drying the same. The pregelatinized starch is exemplified by pregelatinized corn starches, pregelatinized potato starches, and pregelatinized modified starches [e.g., those described in the Code of Federal Regulations U.S.A. §121, 1031a, b, c, d, e, f, g, and h]. Furthermore, there are pregelatinized dry commercial products such as Amycol® C (Nichiden Chemical Company, Japan), Amylox® (Nihon Corn Starch Company, Japan), Pre-Gel® (Hublinder Company U.S.A.), or Instant Cleargel® (National Starch Company, U.S.A.).

Examples of water soluble celluloses include, for example, hydroxypropylcellulose, hydroxymethylcellulose, hydroxypropylmethylcellulose, carboxymethylcellulose, methylcellulose, etc. The water-soluble high molecular weight compounds (water-soluble high polymers) are exemplified by polyvinylpyrrolidone, polyvinylalcohol, dextrin, gum arabic, gelatin, polydextrose, etc.

Binding agents soluble and organic solvents may be, for example, cellulose derivatives soluble and organic solvents, such as cellulose acetate phthalate, hydroxypropylmethylcellulose phthalate, ethylcellulose, etc. However, water-soluble binders (especially water-soluble celluloses) are preferred over binding agents soluble and organic solvents.

The solvent used to prepare a solution containing a binding agent for spraying includes water and organic solvents, for example lower alcohols (e.g., methylalcohol, ethylalcohol, isopropylalcohol, etc.) as well as ketones (e.g., acetone, etc.).

It is preferred that the binder utilized in the invention is at least one water-soluble cellulose selected from the group consisting of hydroxypropylmethylcellulose, hydroxypropylcellulose, hydroxymethylcellulose, carboxymethylcellulose, and methylcellulose. It is most preferred that the binder is hydroxypropylmethylcellulose.

The granulated riboflavin utilized in the present invention may optionally contain a particulate absorbent material. The particulate absorbent material should be present as a coating on the outside of the granules. The absorbent is a material which improves the flowability of the granules and decreases any tendency of the granules to adhere to one another before the drying of the granules has been completed. Suitable particulate absorbents have been described in U.S. Pat. Nos. 4,486,435 and 3,962,384. The absorbents fall into two groups, with each of the above patents describing one of the groups. First, U.S. Pat. No. 3,962,384 describes an ultra-fine absorbent, which in general includes silicic acid, silicon dioxide or various silicates, along with other materials which may be equally effective due to physical properties as opposed to chemical compositions. These absorbents are described as being insoluble in cold water, resistant to wetting by water, having an appreciable capacity to absorb and/or adsorb water and oil (i.e., an oil absorption capacity of from about 150 to 400 pounds per 100 pounds absorbent). Furthermore, they are free-flowing, they do not develop static electricity, and they have a particle size range of from about 2 microns to about 16 microns as well as a surface area of from about 175 to about 360 $m^2/gm$. Examples of these absorbents include silicic acid, silicas, alkali metal silicates, magnesium carbonate, kaolin clays, dicalcium phosphate, tricalcium phosphate and the like. A preferred absorbent from this group is silicic acid, a white amorphous powder, insoluble in water and having the empirical formula of $SiO_2 \cdot x_8{}_2O$.

The second group of absorbents, i.e., those described in U.S. Pat. No. 4,486,435, are termed hydrophobic silica particles. Hydrophobic silicas are a special form of silica made from silica gel, precipitated silica or fumed silica, by a standard treatment known in the art. Such treatments involve the use of silanes or polysilanes to provide the desired hydrophobicity. It is known to provide hydrophobic silicas by treatment of silica gel, precipitated silica or fumed silica with esterfied coatings derived from high boiling alcohols. Other fine particle size materials characterized as hydrophobic may be as effective as the hydrophobic silicas since it is not so much the chemical composition of the final particle size coating composition which is critical, but rather the physical properties of the absorbent. Generally, the coating material must be substantially insoluble in water, have a primary particle size of from about 0.01 microns to about 0.04 microns and have a surface area of from about 90 to about 130 $m^2/gm$. As can be seen in comparing the first group of silicas with the second group of silicas, the second group has a significantly smaller particle size as well as a special hydrophobic character, in comparison with the first group of absorbents. In the product of the present invention, it is most preferred to utilize an absorbent as described in the second group, i.e., as described in U.S. Pat. No. 4,486,435. However, in general, any of the absorbents from either group described above may be utilized in the product of the present invention. Preferably, however, the absorbent is a member selected from the group consisting of silicic acid, silica gel, an alkali metal silicate, magnesium carbonate, kaolin clay, dicalcium phosphate, and a hydrophobic silica having a primary particle size of from about 0.01 microns to about 0.04 microns and having a surface area of from about 90 to about 130 square meters per gram. Preferably, the absorbent is present in the riboflavin granulate in an amount of from about 0.5 weight percent to about 5 weight percent. Preferably, the absorbent is present in an amount of from about 0.5 weight percent to about 2 weight percent, and most preferably the absorbent is present at about 0.5 weight percent, based on the weight of the granulated riboflavin.

FLODEX METHOD FOR FLOWABILITY DETERMINATION

Flowability was measured using a Flodex ® Powder Flowability Index Test Instrument, Model 211, purchased from Hanson Research Corporation, 19727 Bahama Street, P.O. Box 35, Northridge, California, 91328. The Flodex ® apparatus presents a sample method for repeatable determination of characteristics. The Flodex ® device operates powder flow based upon the ability of a powder to fall freely through a hole in a plate. As used herein the Flowability Index was calculated by dividing 1000 by the orifice diameter in millimeters. For example, powder which will pass through an orifice diameter 4 millimeters in diameter, but not smaller, has a Flowability Index of 250.

The setup and operation of the Flodex ® Powder Flowability Index Test Instrument is thoroughly described in the Instruction Manual for the Flodex ® Model 211 apparatus, this Instruction Manual being hereby incorporated by reference. In addition, below is briefly described the method of determining flowability when using this device.

First a 50 gram sample of the powder to be tested was used to fill the receptacle cylinder (funnel) to within about a centimeter from the top of the cylinder. The powder was carefully loaded onto the funnel so that there was no packing of the powder within the funnel (of course, packing would have caused a loss of flowability of the powder). After the loading of the funnel, a minimum of 30 seconds was allowed to pass before the test was begun, in order to allow the possible formation of any flocculi. To begin the test, the release lever was slowly moved forward to drop open the hole closure, without vibration. If the test was positive, the open hole was visible from the top when looking down to see the hole at the bottom. The Flodex ® device should not be tapped or shaken during the test. If the test results were positive, the test was repeated with a smaller orifice diameter, until the orifice was of such a small diameter that a negative result (i.e., lack of flow) was achieved.

The Flodex ® apparatus is supplied with nineteen disks, from 4 to 32 millimeter hole diameters, in one millimeter increments from 4 to 10 millimeters and in 2 millimeter increments for disks having a hole greater than 10 millimeters in diameter. In addition to these disks, the inventors herein had 2 additional disks fabricated, one with a 2 millimeter hole, the other with a one millimeter hole. These two additional disks provided a means for determining flowability indexes of 500 and 1000, respectively.

In general, the granulated riboflavin product of the present invention should have a Flodex (i.e., flowability index) of from about 75 to about 750, and preferably the Flodex is from about 100 to about 500. Most preferably, the Flodex is from about 150 to about 350.

The granulated riboflavin product of the present invention can be produced in a variety of methods. However, the examples below illustrate two general methods by which the product can be produced: (1) spray drying and (2) rotary fluid bed granulation. It has been surprisingly found that either of these processes can be utilized to produce a high riboflavin content granulate which has a very low level of nonagglomerated riboflavin crystals therein. Furthermore, both of these processes have been found to produce granules having a geometric mean particle size of between 50 microns and 600 microns, with standard deviations of from 0–3.

The following examples describe how to make and use the riboflavin granulate described herein. The first six examples provide different methods for making the riboflavin granulate, while Example 7 describes the use of the granulated riboflavin in a flour fortification formulation, while Examples 8 and 9 are comparative examples illustrating the nonobviousness of the flour fortification formulation of the present invention.

EXAMPLE 1

This example illustrates the preparation of a free-flowing, spray dried static-free riboflavin powder containing over 75% by weight riboflavin in the spray dried powder.

In a five gallon tank 66.18 parts of water were heated to 40° C. by a hot plate. 1.61 Parts of water-soluble hydroxypropylmethylcellulose (sold under the trade name "Methocel E-5") were then dissolved into the hot water, while stirring. Thereafter, 32.21 parts by weight of a commercially available riboflavin powder having a purity of 99% to 100% were then added to the solution of water and hydroxypropylmethylcellulose, to yield a yellow/orange suspension of riboflavin. This slurry was then homogenized with a Gifford-Wood homogenizer (manufactured by Geerco). The homogenization was continued for approximately 15 minutes, resulting in the reduction of the viscosity to about 385 centipoise.

Utilizing a laboratory size spray drying apparatus, having a variable speed atomizing wheel, feed tanks, and pump, the previously prepared homogenized riboflavin suspension was metered to the atomizing wheel. The atomizing wheel a slotted-wheel obtained from Niro Atomizers, Inc., 9165 Rumsey Road., Columbia, MD; as used in utility dryer Model IV was operated at 21,000 rpms, a centrifugal speed of about 8,000 meters per minute. The inlet air temperature flowing into the spray dryer chamber was about 200° C., and the outlet air temperature was about 100° C. The riboflavin suspension was fed into the spray atomizing wheel at a rate of about 125 grams per minute.

The resulting granulated riboflavin product was an orange, free-flowing, static-free powder having a bulk density of 0.43 grams per cubic centimeter with a geometric mean particle size of about 58 microns and a log standard deviation of about 1.5 microns. Furthermore, the product had a flowability index, as measured by the Flodex method of at least 333. A flowability index greater than 100 is indicative of excellent flowability. The product mixed well in flour premixes and produced directly compressible tablets with the hardness of 12 scu. The final product (i.e., upon completion of drying) was made up of about 94 weight percent riboflavin, 5 weight percent binder, and 1 weight percent water.

EXAMPLE 2

In a five gallon tank, 72 parts of water were heated to 40° C., and 1.45 parts of water-soluble hydroxypropylmethylcellulose (sold under the trade name "Methocel E-5") were dissolved into the hot water, with stirring. Thereafter, 26.55 parts by weight of a commercially available riboflavin powder having a purity of 99% to 100% were added to the solution to yield a yellow/orange suspension of riboflavin. This suspension was then homogenized using a Gifford-Wood homogenizer (manufactured by Geerco). The homogenization was carried out for approximately 15 minutes in order to reduce the viscosity. The final viscosity of the suspension was about 200 centipoise. The now homogenized riboflavin suspension was metered into the atomizing wheel of a laboratory size spray-drying apparatus, the apparatus having a variable-speed atomizing wheel, feed tanks, and pump. The atomizing wheel was operated at 35,000 rpm, with a centrifugal speed of about 17,500 meters per minute. The spray drying apparatus had an inlet temperature of about 200° C. and an outlet temperature of about 120° C.

The resulting spray-dried, granulated riboflavin product exhibited poor flowability, and contained a great deal of static cling, and had a bulk density of 0.23 grams per cubic centimeter. The geometric mean particle size of this powder was about 41 microns, with a log standard deviation of about 1.5 microns. The flowability index, as measured by the Flodex method, was found to be about 50, i.e., indicative of poor flowability. The low flowability is an indication that this powder will perform poorly in tableting and flour premix tests. The low flowability present in the product produced in this example is believed to be due to the small geometric mean particle size. The product was made up of about 94.5 weight percent riboflavin, 5.0 weight percent binder, and 0.5 weight percent water.

EXAMPLE 3

In a 750 gallon tank, 1.68 parts of water-soluble hydroxypropylmethylcellulose, sold under the trade name "Methocel E-5" were added to 66.45 parts of water, with the hydroxypropylmethylcellulose being dissolved into the hot water, with stirring. Thereafter, 33.55 parts (by weight) of a commercially available riboflavin powder having a purity of 99% to 100% were added to the mixture to yield a yellow/orange suspension of riboflavin. This suspension was then homogenized using a Gifford-Wood homogenizer. After homogenization was finished, the suspension had a viscosity of about 350 centipoise.

The riboflavin suspension was then metered into the atomizing wheel within a commercial spray dryer, the spray dryer having a variable speed atomizing wheel, feed tanks, and pump. The variable speed atomizing wheel was operated at about 8,000 rpm, a centrifugal speed of about 5,110 meters per minute. The spray dryer had an inlet air temperature of about 232° C. and an outlet air temperature of about 90° C.

The resulting granulated riboflavin product was a free-flowing, static-free powder having a bulk density of 0.37 grams per cubic centimeter with a geometric mean particle size of about 172 microns and a log standard deviation of about 1.5 microns. The flowability index, as measured by the Flodex method, was found to be equal to or greater than 333. This product mixed well in flour premixes and produced directly compressible tablets with a hardness of 12.0 scu. The product was made up of about 94.6 weight percent riboflavin, 5 weight percent binder, and 0.4 weight percent water.

EXAMPLE 4

This example illustrates the positive effective produced by hydrophobic silica on the flowability of the product.

A riboflavin slurry was prepared and sprayed using the conditions outlined in Example 3, except that a silica cloud was maintained within the spray-dryer by screw feeding a hydrophobic synthetic silica, sold under the trademark "Aerosil R-972", so as to provide a coating on the spray-dried droplets. This silica coating ultimately constituted between 1 and 2 weight percent of the total weight of the resulting spray-dried riboflavin powder.

The resulting riboflavin powder was very similar in particle size distribution and bulk density to the powder produced by Example 3. The powder was free-flowing, static-free, and had a bulk density of 0.37 grams per cubic centimeter with a geometric mean particle size of about 170 microns and a log standard deviation of about 1.0 microns. The difference between the product of Example 4 and the product of Example 3 was the flowability index. The powder produced with 1% hydrophobic silica had a flowability index of about 500, which was significantly greater than the flowability value measured for the powder produced in Example 3. The product produced according to Example 4 mixed well in flour premixes and produced direct compression tablets with a hardness of 15.5 scu. The product was made up of about 94.6 weight percent riboflavin, 4.0 weight percent binder, 0.4 weight percent water, and 1 weight percent absorbent (i.e., hydrophobic silica).

EXAMPLE 5

This example illustrates a rotary fluid bed process for the preparation of a free-flowing, granulated, static-free riboflavin product which contained over 75% by weight riboflavin in the granulated product, which also contained about 0.5% moisture.

The binder solution was formulated in a five-gallon tank containing 92 parts of water, heated to 40° C. by a hot plate. 8 Parts of water-soluble hydroxypropyl methylcellulose, sold under the trademark "Methocel E-5", were dissolved into the hot water by stirring. This mixture was stirred for approximately 0.5 hours to completely dissolve the Methocel E-5.

3 Kilograms of a commercially available riboflavin powder having a purity of 99% to 100% were charged into the bowl of a laboratory size roto-granulator, having a variable speed rotating disk, feed tanks, and binder solution pump. The riboflavin was fluidized by two distinct forces: the rotating disk, turning at 200 rpm, and fluidizing air, with between 200 and 300 cubic feet per minute being passed through the slit (a gap of about 2 millimeters) between the rotating disk and the wall of the fluid bed. After the riboflavin was fluidized, the previously prepared binder solution was sprayed tangentially, at a rate of 165 grams per minute, into the riboflavin cloud through a two fluid 1.2 mm nozzle utilizing 3.0 bar air to atomize the binder solution. After the binder addition was complete, the granulated riboflavin product was dried by raising the inlet temperature of the fluidizing air to 72° C.

The resulting riboflavin product was an orange, free-flowing, static-free powder having a bulk density of 0.48 grams per cubic centimeter and a geometric mean particle size of about 250 microns with a log standard deviation of 1.94 microns. The flowability index, as measured by the Flodex method, was found to be about 200. Any value greater than or equal to 100 is indicative of excellent flowability. The product was made up of about 96 weight percent riboflavin, 3.75 weight percent binder, and 0.25 weight percent water. The resulting granulate was directly compressed to form tablets. The tablets had a hardness of 15.5 scu.

EXAMPLE 6

This example illustrates the necessity of homogenizing the riboflavin, binder and water slurry if a spray-dried granulate is being produced.

In a five-gallon tank containing 66.18 parts of water heated to 40° C. by a hot plate, 1.61 parts of water-soluble hydroxypropyl methylcellulose (sold under the trade name "Methocel E-5") were dissolved into the hot water by stirring with a "Lightnin" brand mixer with a 3.5 inch marine prop blade. Thereafter, 32.21 parts by weight of a commercially available riboflavin powder, having a purity of 99% to 100%, were added to the mixture, while stirring with the Lightnin mixer, to yield a yellow/orange suspension of riboflavin. The slurry had the consistency of a paste, and its viscosity was in excess of 8,000 centipoise. In this form the slurry was not suitable for spray drying because this paste could not be pumped or, more importantly, atomized using conventional spray drying equipment.

The slurry was then homogenized, using a Gifford-Wood homogenizer, for approximately 15 minutes. This reduced the viscosity to 385 centipoise. This slurry was then spray dried under the conditions present in Example 1. The resulting spray-dried granulate produced was the same as the granulate described in Example 1.

EXAMPLES 7A-7C

In Examples 7A-7C, approximately 79 grams of a riboflavin component were added to a lab-scale V-blender, and mixed therein for about 2 hours in the present of:

| approximately | 115 grams of thiamine; |
|---|---|
| | 909 grams of niacin; |
| | 1836 grams of modified corn starch; and |
| | 60 grams of phosphate. |

A Westinghouse 0.75 V-blender was used. The blender was equipped with 0.75 horsepower motor. The V-blender was operated at about 30 rpm. The V-blender contained a total of about 3000 grams of material.

The blending operation was carried out for about 2 hours. Samples were taken about every 30 minutes, in order to check mix characteristics. Although a flour fortification formulation typically comprises about 25 weight percent of reduced iron, the iron was not used in these experiments because its presence would interfere with the observation of the degree of intermixture of the riboflavin granules. Each sample was sieved at the end of the two hour mix cycle, and a smear was made across white paper in order to determine if there were any riboflavin agglomerates present.

The spatula smear test has been used for years by the flour industry as a qualitative/quantitative test for homogeneous mixing. This test is conducted by taking a small amount of the flour premix (e.g., about 25 grams) and "drawing" it across white paper with a flat spatula. If yellow streaks are present then either the mix was not homogeneous enough, or the riboflavin exhibited electrostic tendencies. Ungranulated crystalline riboflavin exhibited streaking in the premix whereas spray-dried riboflavin granules did not produce streaking in the premix.

7A

In Example 7A, a riboflavin "compactate" was utilized. The compactate was a granulate of about 100 percent pure riboflavin crystals which had been mechanically granulated via pressure. The compactate had an average granule size of about 460 microns. As can be seen in Table 1, even after 2 hours of mixing in the V-blender, the resulting fortification formulation contained a relatively large percentage (i.e., relative to Examples 7B and 7C) of relatively large particles. Furthermore, during the smear work-up the compactate product was very coarse and "crunchy" when smeared across the paper. The relatively large compactate granules were not broken apart by the spatula, and thus during the smear work-up the compactate granules became somewhat segregated from the remaining ingredients. Sieving of the compactate-containing formulation also removed the large compactate particles.

In summary, the compactate-containing formulation was characterized as unsuitable for flour fortification formulations, because the large compactate particle size produced speckled mixtures. Furthermore, the riboflavin compactate demixed from the remainder of the ingredients in the formulation.

7B

In Example 7B, a riboflavin granulate produced in accord with Example 6 (i.e., roto-granulated) was used to make a flour fortification formulation. The average granule particle size was found to be about 460 microns, i.e., smaller than the average particle size of the compactate riboflavin granules. However, these granules (produced via roto-granulation) still had a particle size significantly larger than the particle size of the remainder of the components present in the formulation. Upon mixing in the V-blender for 2 hours, these granules still appeared larger than the particle size of the remainder of the components of the formulation. During the smear work-up the granules remained discreet, and were considered to be too large and the smear was considered to lack homogeneity. When sieved, the roto-granulated granules were completely removed by passing the mixtures through a 325 mesh screen, providing further evidence that the roto-granulated granules had a particle size significantly larger than the particle size of the additional ingredients in the formulation. In summary, the roto-granulated granules as well as the compactate granules of Example 7A, were found to be too large for use in the flour fortification formulation of the present invention.

7C

In this Example, the riboflavin granulate utilized in the formulation was produced via spray drying. The spray drying process was carried out substantially as described in Example 1. Relative to Examples 7A and 7B, the riboflavin granulate produced via spray drying had a small particle size. Furthermore, the particle size of the spray-dried granulate was substantially the same as the particle size of the other ingredients in the formulation. There was essentially no demixing (i.e., particle separation) produced upon either the spatula smear work-up or sieving. The formulation exhibited no streaking from riboflavin. No riboflavin agglomerates were formed during the mixing process, in stark contrast to the formulation of agglomerates produced when using substantially 100 percent pure, ungranulated riboflavin in the formulation.

TABLE I

Sieve Analysis of the Riboflavin Granulates Used in Example 7A-7C

| Mesh Size | 7A (compactate-granulate) | 7B (roto-granulate) | 7C (spray-granulate) |
|---|---|---|---|
| 40 | 1.00 | 0.84 | 0.16 |
| 60 | 1.52 | 1.24 | 0.28 |
| 100 | 1.48 | 1.32 | 1.72 |
| 120 | 0.68 | 0.68 | 0.92 |
| 200 | 3.24 | 3.44 | 2.44 |
| 325 | 14.72 | 16.98 | 13.42 |
| PAN | 77.36 | 75.60 | 81.24 |

In Example 7B, the material in the pan was completely white, indicating the complete absence of riboflavin. However, as can be seen by the large amount of material in the pan, the majority of the other ingredients in the formulation passed through the 325 mesh screen. In Example 7A, the material in the pan was only slightly yellow, indicating that the majority of the riboflavin failed to pass through the 325 mesh screen. In Example 7C, however, the material in the pan was a much darker yellow, indicating that a much greater percentage of the spray-dried riboflavin granulate has passed through the 325 mesh screen.

Accordingly for the present invention the average granule size should, in general, be from about 50 microns to about 300 microns. Preferably the average granule size is from about 50 microns to about 180 microns. Most preferably the average granule size is from about 50 microns to about 130 microns. Although the compactate-granulate and the roto-granulate used in Examples 7A and 7B were too large to be desired for use in the present invention, it is believed that granules produced via compaction and roto-granulation processes are useful in the formulation of the present invention, so long as an appropriate average granule size is obtained (i.e., 50-300 micron average granule size). However, preferably the granulate is produced via the highly-economical process of spray drying.

We claim:

1. A flour fortification formulation which comprises riboflavin in an amount of from about 0.5 weight percent to about 10 weight percent, riboflavin assay basis, the riboflavin being in the form of a riboflavin granulate, the riboflavin granulate having a flowability index of from about 75 to about 750, with riboflavin granules having an average granule size of from about 50 microns to about 300 microns, the riboflavin granules comprising water in an amount of from about 0.1 weight percent to about 4 weight percent, total granulate weight basis, and wherein at least 90 weight percent of the riboflavin is present in the form of granules, the granules being comprised of riboflavin in an amount of from at least about 75 weight percent to about 99.5 weight percent.

2. A flour fortification formulation as described in claim 1 wherein the riboflavin granules have a geometric mean particle size of from about 50 microns to about 180 microns.

3. A flour fortification formulation as described in claim 2 wherein the riboflavin granules have a geometric mean particle size of from about 50 microns to about 130 microns, with a standard deviation of from about 1.0 to about 2.2.

4. A flour fortification formulation as described in claim 1 wherein the riboflavin, by itself exhibits a flowability of from about 150 to about 350.

5. A flour fortification formulation as described in claim 1 wherein the riboflavin has been granulated with a binder, the binder being present with the riboflavin in an amount of from about 0.5 weight percent to about 25 weight percent, the binder being at least one member selected from the group consisting of pregelatinized starches, water-soluble celluloses, and water-soluble, edible high polymers.

6. A flour fortification formulation as described in claim 1 wherein the riboflavin granules are substantially round.

7. A flour fortification formulation as described in claim 1 wherein the riboflavin granules were produced via a spray drying process.

8. A flour fortification formulation as described in claim 2 wherein the riboflavin granules are comprised of from about 90 weight percent to about 99.5 weight percent riboflavin and from about 0.1 weight percent to about 0.75 weight percent water, and from about 0.5 to about 10 weight percent of a binder which is at least one water-soluble cellulose selected from the group consisting of hydroxypropylcellulose, hydroxymethylcellulose, hydroxypropylmethylcellulose, carboxymethylcellulose, and methylcellulose, and wherein riboflavin is present in said flour fortification formulation in an amount of from about 0.5 weight percent to about 5 weight percent, riboflavin assay basis.

9. A flour fortification formulation as described in claim 8 wherein the binder is hydroxypropylmethylcellulose.

10. A flour fortification formulation as described in claim 8 wherein the riboflavin granulate has an absorbent coating thereon, the absorbent being present in the granulate in an amount of from about 0.5 weight percent to about 5 weight percent, based on total granulate weight, and wherein the absorbent is at least one member elected from the group consisting of hydrophobic silica, silicic acid, silica gel, an alkali metal silicate, magnesium carbonate, kaolin clay, and dicalcium phosphate.

11. A flour fortification formulation as described in claim 10 wherein the absorbent is hydrophobic silica, the hydrophobic silica having a primary particle size of from about 0.01 microns to about 0.04 microns.

12. A flour fortification formulation as described in claim 8 wherein the riboflavin granulate is comprised of from about 0.5 weight percent to about 2 weight percent hydrophobic silica, from about 94 to about 96 weight percent riboflavin, from about 0.1 weight percent to about 0.5 weight percent water, and from about 3 weight percent to about 5 weight percent of hydroxypropylmethylcellulose as the binder, and wherein the average granule size is from about 50 microns to about 130 microns and wherein riboflavin is present in said flour fortification formulation in an amount of from about 2 weight percent to about 2.3 weight percent, riboflavin assay basis.

13. A flour fortification formulation as described in claim 12 wherein the riboflavin granulate is produced via a spray drying process.

* * * * *